(12) United States Patent
Abel et al.

(10) Patent No.: US 10,648,428 B2
(45) Date of Patent: May 12, 2020

(54) AIRCRAFT THRUST REVERSER SYSTEM WITH HYDRAULIC ASSIST DEVICE

(71) Applicant: HONEYWELL INTERNATIONAL INC., Morris Plains, NJ (US)

(72) Inventors: Steve Abel, Chandler, AZ (US); James Wawrzynek, Phoenix, AZ (US); Patrick Hinke, Phoenix, AZ (US); Ron Vaughan, Gilbert, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 780 days.

(21) Appl. No.: 15/290,176

(22) Filed: Oct. 11, 2016

(65) Prior Publication Data

US 2018/0058374 A1 Mar. 1, 2018

Related U.S. Application Data

(60) Provisional application No. 62/378,955, filed on Aug. 24, 2016.

(51) Int. Cl.
| F02K 1/76 | (2006.01) |
| F02K 1/64 | (2006.01) |
| F16F 9/19 | (2006.01) |
| F16F 9/32 | (2006.01) |
| F16F 9/34 | (2006.01) |
| F16F 9/516 | (2006.01) |

(Continued)

(52) U.S. Cl.
CPC ............ *F02K 1/763* (2013.01); *F02K 1/64* (2013.01); *F02K 1/76* (2013.01); *F16F 9/19* (2013.01); *F16F 9/3292* (2013.01); *F16F 9/34* (2013.01); *F16F 9/516* (2013.01); *F02K 1/70* (2013.01); *F05D 2220/323* (2013.01); *F16F 9/512* (2013.01); *F16F 2230/0052* (2013.01)

(58) Field of Classification Search
CPC ... F02K 1/763; F02K 1/76; F02K 1/70; F02K 1/72; F02K 1/64; F05D 2260/406
See application file for complete search history.

(56) References Cited

U.S. PATENT DOCUMENTS

| 3,002,497 | A | * | 10/1961 | Gulick | ............... F02K 1/76 |
| | | | | | 137/624.27 |
| 3,699,994 | A | * | 10/1972 | Mohri | ............... F16H 61/64 |
| | | | | | 137/115.15 |
| 4,391,409 | A | | 7/1983 | Scholz | |

(Continued)

FOREIGN PATENT DOCUMENTS

EP 2865851 A1 4/2015

OTHER PUBLICATIONS

Extended EP Search Report for Application No. 17184373.3-1007 dated Jan. 18, 2018.

*Primary Examiner* — Steven M Sutherland
*Assistant Examiner* — Thuyhang N Nguyen
(74) *Attorney, Agent, or Firm* — Lorenz & Kopf, LLP (57) ABSTRACT

A thrust reverser system for a gas turbine engine includes a support structure, a transcowl, an actuator, and a hydraulic assist mechanism. The actuator is configured to supply an actuation force to the transcowl to thereby move the transcowl between the stowed and deployed positions. The hydraulic assist mechanism is coupled to the transcowl and is configured to react reverse thrust loads on the transcowl at least when the transcowl is translating between the stowed position and the deployed position.

18 Claims, 3 Drawing Sheets

(51) Int. Cl.
*F02K 1/70* (2006.01)
*F16F 9/512* (2006.01)

(56) References Cited

U.S. PATENT DOCUMENTS

| | | |
|---|---|---|
| 8,170,771 B2 * | 5/2012 | Calmelat .................. F02K 1/76 60/226.2 |
| 8,511,973 B2 | 8/2013 | Ramlaoui et al. |
| 8,713,911 B2 | 5/2014 | Kopecek et al. |
| 2011/0296813 A1 | 12/2011 | Frank et al. |
| 2012/0079805 A1 | 4/2012 | Stuart et al. |
| 2016/0108853 A1 | 4/2016 | Gormley |

* cited by examiner

AIRCRAFT THRUST REVERSER SYSTEM WITH HYDRAULIC ASSIST DEVICE

CROSS-REFERENCE TO RELATED APPLICATION

This application claims the benefit of U.S. Provisional Application No. 62/378,955, filed Aug. 24, 2016.

TECHNICAL FIELD

The present invention generally relates to aircraft thrust reversers, and more particularly relates to an aircraft thrust reverser system that includes one or more hydraulic assist devices.

BACKGROUND

When turbine-powered aircraft land, the wheel brakes and the imposed aerodynamic drag loads (e.g., flaps, spoilers, etc.) of the aircraft may not be sufficient to achieve the desired stopping distance. Thus, the engines on most turbine-powered aircraft include thrust reversers. Thrust reversers enhance the stopping power of the aircraft by redirecting the engine exhaust airflow in order to generate reverse thrust. When stowed, the thrust reverser typically forms a portion the engine nacelle and forward thrust nozzle. When deployed, the thrust reverser typically redirects at least a portion of the airflow (from the fan and/or engine exhaust) forward and radially outward, to help decelerate the aircraft.

Various thrust reverser designs are commonly known, and the particular design utilized depends, at least in part, on the engine manufacturer, the engine configuration, and the propulsion technology being used. Thrust reverser designs used most prominently with turbofan engines fall into two general categories: (1) fan flow thrust reversers, and (2) mixed flow thrust reversers. Fan flow thrust reversers affect only the bypass airflow discharged from the engine fan. Whereas, mixed flow thrust reversers affect both the fan airflow and the airflow discharged from the engine core (core airflow).

Fan flow thrust reversers are typically used on relatively high-bypass ratio turbofan engines. Fan flow thrust reversers include so-called "Cascade-type" or "Translating Cowl-type" thrust reversers. Fan flow thrust reversers are generally positioned circumferentially around the engine core aft of the engine fan and, when deployed, redirect fan bypass airflow through a plurality of cascade vanes disposed within an aperture of a reverse flow path. Typically, fan flow thrust reverser designs include one or more translating sleeves or cowls ("transcowls") that, when deployed, open an aperture, expose cascade vanes, and create a reverse flow path. Fan flow reversers may also include so-called pivot doors or blocker doors which, when deployed, rotate to block the forward thrust flow path.

In contrast, mixed flow thrust reversers are typically used with relatively low-bypass ratio turbofan engines. Mixed flow thrust reversers typically include so-called "Target-type," "Bucket-type," and "Clamshell Door-type" thrust reversers. These types of thrust reversers typically use two or more pivoting doors that rotate, simultaneously opening a reverse flow path through an aperture and blocking the forward thrust flow path. However, a transcowl type thrust reverser could also be configured for use in a mixed flow application. Regardless of type, mixed flow thrust reversers are necessarily located aft or downstream of the engine fan and core, and often form the aft part of the engine nacelle.

Transcowl type thrust reversers transition from the forward thrust state to the reverse thrust state by translating the transcowl aft so as to open a reverse thrust aperture, and simultaneously rotating a set of doors so as to obstruct the forward thrust nozzle. The actuation system must, therefore, manage both resisting and aiding loads. In some cases, the aiding loads are much higher than the resisting loads. Moreover, the static loads incurred at the deploy stop when the engine powers up can be even greater. This burden can increase the power demand and structural design requirements.

Hence there is a need for a thrust reverser actuation system configuration that will simultaneously provide a light-weight solution and a clean airstream, while continuing to provide load paths used to react aerodynamic loads. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a thrust reverser system for a gas turbine engine includes a support structure, a transcowl, an actuator, and a hydraulic assist mechanism. The support structure is configured to be mounted to the turbine engine. The transcowl is mounted on the support structure and is axially translatable, relative to the support structure, between a stowed position and a deployed position. The actuator is configured to supply an actuation force to the transcowl to thereby move the transcowl between the stowed and deployed positions. The hydraulic assist mechanism is coupled to the transcowl and is configured to react reverse thrust loads on the transcowl at least when the transcowl is translating between the stowed position and the deployed position. The hydraulic assist mechanism includes a housing, a piston, a rod, a snubbing conduit, and a throttle valve. The housing has an inner surface that defines a piston chamber. The piston is movably disposed within the housing and divides the piston chamber into a first variable fluid volume and a second variable fluid volume. The rod has a first end and a second end. The first end is coupled to the piston, and the second end is coupled to the transcowl, whereby the first variable fluid volume decreases when the transcowl is translating between the stowed position and the deployed position. The snubbing conduit is in fluid communication with the first fluid volume and the second fluid volume. The throttle valve is disposed within the snubbing conduit and is configured to throttle fluid flow from the first variable fluid volume to the second variable fluid volume when the transcowl is translating between the stowed position and the deployed position.

In another embodiment, a thrust reverser system for a gas turbine engine includes a support structure, a transcowl, an actuator, and a hydraulic assist mechanism. The support structure is configured to be mounted to the turbine engine. The transcowl is mounted on the support structure and is axially translatable, relative to the support structure, between a stowed position and a deployed position. The actuator is configured to supply an actuation force to the transcowl to thereby move the transcowl between the stowed and deployed positions. The hydraulic assist mechanism is coupled to the transcowl and is configured to react reverse thrust loads on the transcowl at least when the transcowl is translating between the stowed position and the deployed position. The hydraulic assist mechanism includes a housing, a piston, a rod, a snubbing conduit, a snubbing orifice, a throttle valve, a stow conduit, and a check valve. The housing has an inner surface that defines a piston chamber. The piston is movably disposed within the housing and divides the piston chamber into a first variable fluid volume and a second variable fluid volume. The rod has a first end and a second end. The first end is coupled to the piston, and the second end coupled to the transcowl, whereby the first variable fluid volume decreases when the transcowl is translating between the stowed position and the deployed position. The snubbing conduit is in fluid communication with the first fluid volume and the second fluid volume. The snubbing orifice is formed in the housing between the first variable fluid volume and the snubbing conduit. The throttle valve is disposed within the snubbing conduit and is configured to throttle fluid flow from the first variable fluid volume to the second variable fluid volume when the transcowl is translating between the stowed position and the deployed position. The stow conduit is in fluid communication with the first variable fluid volume and the second variable fluid volume. The check valve is disposed within the stow conduit and is movable between a normally shut position and an open position.

In yet another embodiment, a thrust reverser system for a gas turbine engine includes a support structure, a transcowl, an actuator, and a hydraulic assist mechanism. The support structure is configured to be mounted to the turbine engine. The transcowl is mounted on the support structure and is axially translatable, relative to the support structure, between a stowed position and a deployed position. The actuator is configured to supply an actuation force to the transcowl to thereby move the transcowl between the stowed and deployed positions. The hydraulic assist mechanism is coupled to the transcowl and is configured to react reverse thrust loads on the transcowl at least when the transcowl is translating between the stowed position and the deployed position. The hydraulic assist mechanism includes a housing, a piston, a rod, a stow conduit, a check valve, a snubbing conduit, an accumulator, and a throttle valve. The housing has an inner surface that defines a piston chamber. The piston is movably disposed within the housing and divides the piston chamber into a first variable fluid volume and a second variable fluid volume. The rod has a first end and a second end. The first end is coupled to the piston, and the second end coupled to the transcowl, whereby the first variable fluid volume decreases when the transcowl is translating between the stowed position and the deployed position. The stow conduit is in fluid communication with the first variable fluid volume and the second variable fluid volume. The check valve is disposed within the stow conduit and is movable between a normally shut position and an open position. The snubbing conduit is in fluid communication with the first fluid volume and the second fluid volume. The accumulator is in fluid communication with the snubbing conduit and the stow conduit. The throttle valve is disposed within the snubbing conduit and is configured to throttle fluid flow from the first variable fluid volume to the second variable fluid volume when the transcowl is translating between the stowed position and the deployed position. The throttle valve includes a valve body, a spool, and a spring. The valve body includes a first control volume and a second control volume, the spool is movably disposed within the valve body, and the spring is disposed within the first control volume and supplies a bias force to the spool.

Furthermore, other desirable features and characteristics of the aircraft thrust reverser system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
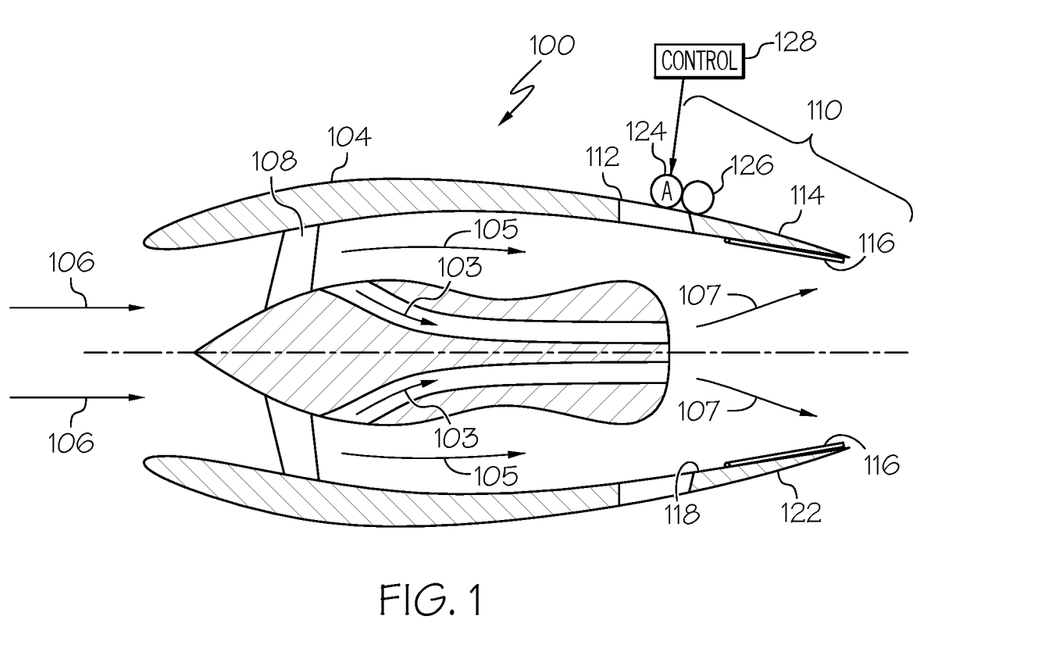
FIGS. 1 and 2 depict a turbofan engine equipped with a mixed flow thrust reverser system, and with the thrust reverser system in a stowed position and deployed position, respectively.
Figure 2:
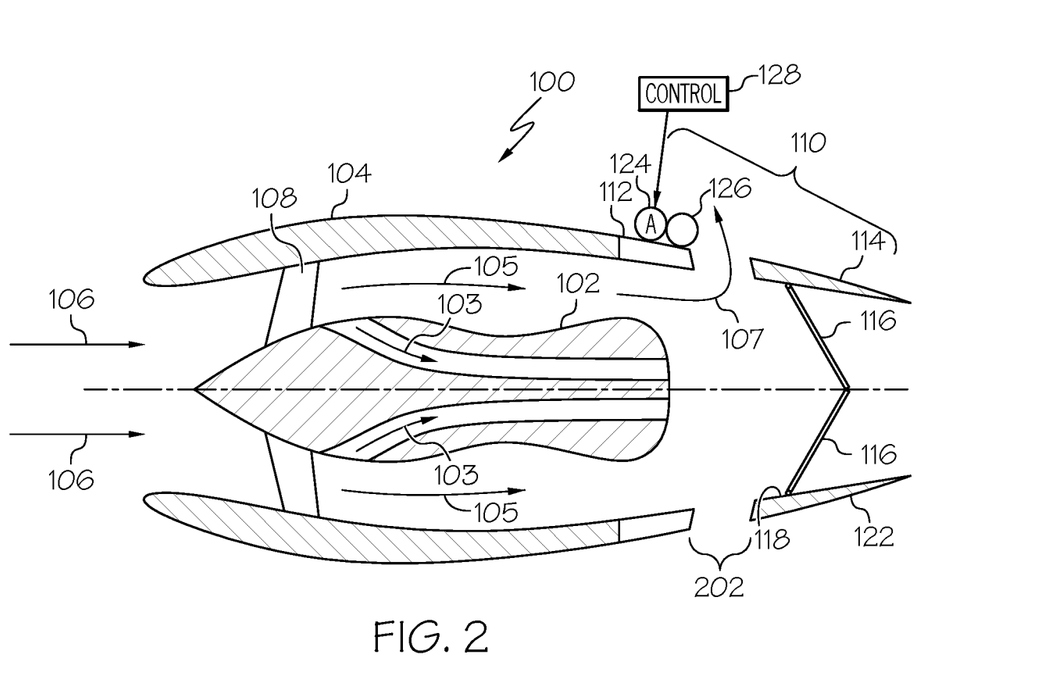
Figure 3:
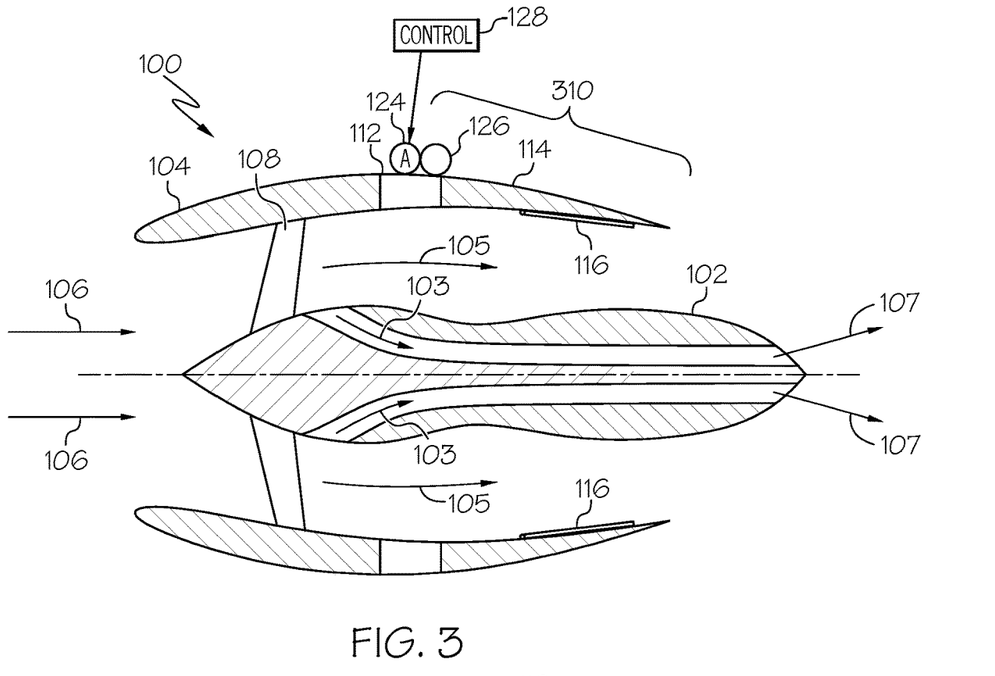
FIGS. 3 and 4 depict a turbofan engine equipped with a fan flow thrust reverser system, and with the thrust reverser system in a stowed position and deployed position, respectively.
Figure 4:
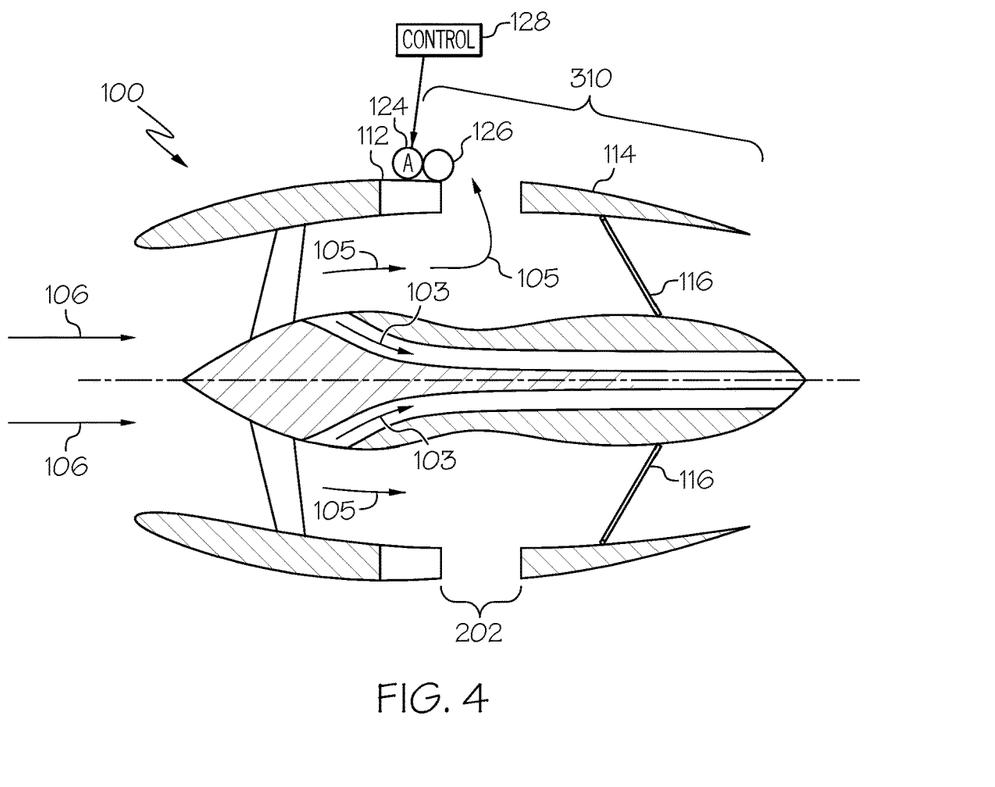

A turbofan engine is a component of an aircraft's propulsion system that typically generates thrust by means of an accelerating mass of gas. Simplified cross section views of a traditional aircraft turbofan engine 100 are depicted in FIGS. 1-4. In particular, FIGS. 1 and 2 depict the engine 100 equipped with a mixed flow thrust reverser system, and with the thrust reverser system in a stowed position and deployed position, respectively, and FIGS. 3 and 4 depict the engine 100 equipped with a fan flow thrust reverser system, and with the thrust reverser system in a stowed position and deployed position, respectively.

Referring first to FIGS. 1 and 2, the turbofan engine 100 includes a gas turbine engine 102 that is encased within an aerodynamically smooth outer covering, generally referred to as the nacelle 104. Ambient air 106 is drawn into the nacelle 104 via a rotationally mounted fan 108 to thereby supply engine airflow. A portion of the engine airflow is drawn into the gas turbine engine 102, where it is pressurized, and mixed with fuel and ignited, to generate hot gasses known as core flow 103. The remainder of engine airflow bypasses the gas turbine engine 102 and is known as fan flow 105. The core flow 103 and the fan flow 105 mix downstream of the gas turbine engine 102 to become the engine exhaust flow 107, which is discharged from the turbofan engine 100 to generate forward thrust.

The nacelle 104 comprises a mixed flow thrust reverser system 110. The thrust reverser system 110 includes a support structure 112, an annular translatable cowl, or transcowl 114, and one or more doors 116 (two in the depicted embodiment). The transcowl 114 is mounted on the support structure 112 and has an inner surface 118 and an outer surface 122. The transcowl 114 is axially translatable, relative to the support structure 112, between a stowed position, which is the position depicted in FIG. 1, and a deployed position, which is the position depicted in FIG. 2. In the stowed position, the transcowl 114 is disposed adjacent the support structure 112. In the deployed position, the transcowl 114 is displaced from the support structure 112 by a second distance to form a reverse thrust aperture 202 (see FIG. 2).

Each of the one or more doors 116 is rotatable between a first position, which is the position depicted in FIG. 1, and a second position, which is the position depicted in FIG. 2. More specifically, each door 116 is rotatable between the first position and the second position, when the transcowl 114 translates between the stowed position and the deployed position, respectively. As is generally known, each door 116 is configured, when it is in the second position, to redirect at least a portion of the engine airflow through the reverse thrust aperture 202 to thereby generate reverse thrust. In particular, at least a portion of the engine exhaust flow 107 (e.g., mixed core flow 103 and fan flow 105) is redirected through the reverse thrust aperture 202.

Referring now to FIGS. 3 and 4, the turbofan engine 100 equipped with a fan flow thrust reverser system 310 will be briefly described. Before doing so, however, it is noted that like reference numerals in FIGS. 1-4 refer to like parts, and that descriptions of the like parts of the depicted turbofan engines 100 will not be repeated. The notable difference between the turbofan engine 100 depicted in FIGS. 3 and 4 is that the fan flow thrust reverser system 310 is disposed further upstream than that of the mixed flow thrust reverser system 110 depicted in FIGS. 1 and 2.

As with the mixed flow thrust reverser system 110, the depicted fan flow thrust reverser system 310 includes the support structure 112, the transcowl 114, and the one or more doors 116 (again, two in the depicted embodiment). Moreover, each door 116 is rotatable between a first position, which is the position depicted in FIG. 3, and a second position, which is the position depicted in FIG. 4. Similarly, each door 116 is rotatable between the first position and the second position, when the transcowl 114 translates between the stowed position and the deployed position, respectively. As is generally known, each door 116 is configured, when it is in the second position, to redirect at least a portion of the engine airflow through the reverse thrust aperture 202 to thereby generate reverse thrust. In this case, however, only fan bypass flow 105 is redirected through the reverse thrust aperture 202.

As FIGS. 1-4 also depict, the thrust reverser systems 110, 310 additionally include a plurality of actuators 124 and a plurality of hydraulic assist mechanisms 126. Each actuator 124 is coupled to the support structure 112 and a transcowl 114, and is configured to supply an actuation force to the transcowl 114. More specifically, each actuator 124 is responsive to commands supplied from a control 128 to supply an actuation force to the transcowl 114, to thereby move the transcowl 114 between the stowed position and the deployed position. It will be appreciated that the main actuators 124 may be implemented using any one of numerous types of actuators. In the depicted embodiment, each is implemented using linear screw-type actuator that includes an alternate reverse thrust load path.

Figure 5:
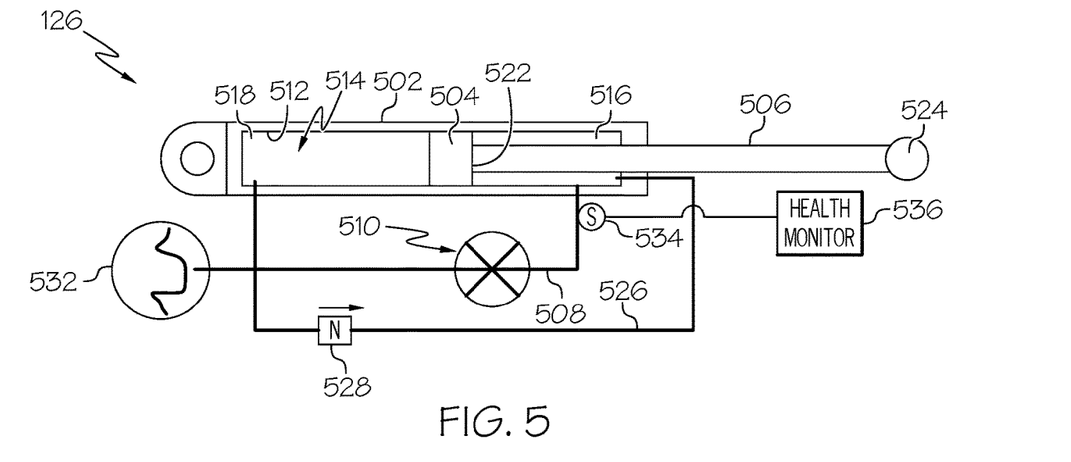
FIG. 5 depicts a functional schematic representation of a hydraulic assist mechanism that may be used in the embodiments of FIGS. 1-4.

Each hydraulic assist mechanism 126 is coupled to a transcowl 114 and is configured to react reverse thrust loads on the transcowl 114 at least when the transcowl 114 is translating between the stowed position and the deployed position. Although the configuration of each hydraulic assist mechanism 126 may vary, one particular configuration is depicted in FIG. 5, and with reference thereto will now be described.

The depicted hydraulic assist mechanism 126 includes a housing 502, a piston 504, a rod 506, a snubbing conduit 508, and a throttle valve 510. The housing 502 has an inner surface 512 that defines a piston chamber 514. A fluid, such as a suitable hydraulic fluid, is preferably disposed within the piston chamber 514. The piston 504 is movably disposed within the housing 502, and more specifically within the piston chamber 514, and divides the piston chamber 514 into a first variable fluid volume 516 and a second variable fluid volume 518.

The rod 506 has a first end 522 and a second end 524. The first end 522 is coupled to the piston 504, and the second end 524 is coupled to the transcowl 114 (not depicted in FIG. 5). Thus, when the transcowl 114 is translating from the stowed position to the deployed position, the first variable fluid volume 516 decreases and the second variable fluid volume 518 increases. Conversely, when the transcowl 114 is translating from the deployed position to the stowed position, the first variable fluid volume 516 increases and the second variable fluid volume 518 decreases.

The snubbing conduit 508 is in fluid communication with the first variable fluid volume 516 and the second variable fluid volume 518, and the throttle valve 510 is disposed within the snubbing conduit 508. The throttle valve 510 is configured to throttle fluid flow in the snubbing conduit 508 from the first variable fluid volume 516 to the second variable fluid volume 518 when the transcowl 114 is translating between the stowed position and the deployed position.

Figure 6:
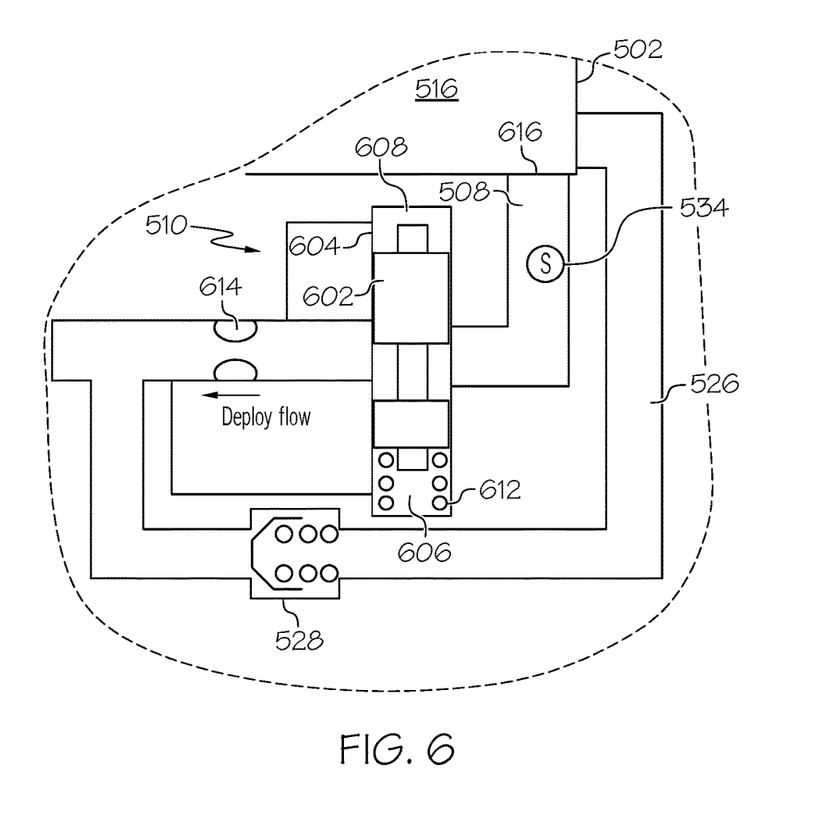
FIG. 6 depicts a more detailed functional schematic representation of a portion of the hydraulic assist mechanism depicted in FIG. 5.

As shown more clearly in FIG. 6, the throttle valve 510, at least in the depicted embodiment, is implemented using a spring-loaded spool 602. The spool 602 is disposed within a valve body 604 which has a first control volume 606 and a second control volume 608. A spring 612 is disposed within the first control volume 606 and biases the spool 602 toward a more open position. The first control volume 606 is in fluid communication with the snubbing conduit 508 downstream of a sense orifice 614, which is disposed downstream of the throttle valve 510. The second control volume 608 is in fluid communication with the snubbing conduit 508 upstream of the sense orifice 614.

As FIGS. 5 and 6 also depict, the hydraulic assist mechanism 126 also preferably includes a stow conduit 526, a check valve 528, and an accumulator 532. The stow conduit 526 is in fluid communication with the first variable fluid volume 516 and the second variable fluid volume 518. The check valve 528 is disposed within the stow conduit 616 and is movable between a normally shut position, which is the position depicted in FIG. 6, and an open position, which occurs when fluid pressure in the second variable fluid volume 518 exceeds the fluid pressure in the first variable fluid volume 516.

The accumulator 532 is in fluid communication with both the snubbing conduit 508 and the stow conduit 532 and implements several functions. One is to make up flow due to the unequal area piston design. Another is to accommodate fluid expansion due to the temperature changes. In addition, the accumulator 532 allows for a modest amount of leakage. For multiple cylinders on a single cowl, one accumulator may be shared.

When the transcowl 114 is moving in the stow direction, the second variable fluid volume 518 decreases and the first variable fluid volume 516 increases. As a result, the check valve 528 opens, and fluid flows relatively freely, via the stow conduit 526, from the second variable fluid volume 518 to the first variable fluid volume 516, so as to impart minimal load. Hydraulic pressures are relatively low during this sequence, and are set by the gas charge on the accumulator 532.

Now, when the transcowl 114 is translating from the stowed position to the deployed position, the first variable fluid volume 516 decreases and the second variable fluid volume 518 increases. As a result, flow through the stow conduit 526 is blocked, but flow through the snubbing conduit 508 is allowed. At a certain deploy speed, a differential pressure develops across the sense orifice 614. This differential pressure is also developed across the spool 602 and begins to modulate it closed. This speed dependent closing of the spool 602 causes further restriction and back pressure and ultimately a damping force. Across a small over speed range, the hydraulic assist mechanism is able to carry a substantial portion of the over hauling deploy load. For some off-nominal operations, this may be as much as 75%, whereas for nominal deploy operations this may be 10%. Choice of fluid in combination with sense orifice 614 design keeps the fluid flow turbulent over the temperature range thus rendering it temperature insensitive. The damping versus speed characteristic is set by spring 612 preload and spring rate.

Preferably, the deploy fluid path is also equipped with a snubbing feature to cause deceleration at the end of the deploy stroke. In the depicted embodiment, this feature is implemented using a snubbing orifice 616 that is covered by the piston 504. This snubbing feature, as may be appreciated, is not active in the stow direction, nor is there a need for snubbing in the stow direction since these loads are always resisting.

In some embodiments, a health monitoring pressure sensor 534 is disposed in the snubbing conduit 508 between the snubbing orifice and the throttle valve 510. The pressure sensor 534 is configured to sense (1) accumulator pressure when at rest and (2) damping pressure during deploy, and supplies these pressure signals to, for example, a health monitor system 536.

The system described herein absorbs the aiding load power during motion and holds the system against static deploy stop loads, thereby reducing the size and results in less power dissipation. The system relies on a passive device, which requires no additional electronics or communication connections. Furthermore, the device is self-contained, so that no hydraulic, electric, or pneumatic connections to the aircraft or engine are required either.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A thrust reverser system for a gas turbine engine, comprising:
   a support structure configured to be mounted to the gas turbine engine;
   a transcowl mounted on the support structure and axially translatable, relative to the support structure, between a stowed position and a deployed position;
   an actuator responsive to commands supplied from a control to supply an actuation force to the transcowl to thereby move the transcowl between the stowed and deployed positions; and
   a hydraulic assist mechanism coupled to the transcowl and configured to react reverse thrust loads on the transcowl at least when the transcowl is translating between the stowed position and the deployed position, the hydraulic assist mechanism including:
      a housing having an inner surface that defines a piston chamber,
      a piston movably disposed within the housing and dividing the piston chamber into a first variable fluid volume and a second variable fluid volume,
      a rod having a first end and a second end, the first end coupled to the piston, the second end coupled to the transcowl, whereby the first variable fluid volume decreases when the transcowl is translating between the stowed position and the deployed position,
      a snubbing conduit in fluid communication with the first fluid volume and the second fluid volume,
      a throttle valve disposed within the snubbing conduit and configured to throttle fluid flow from the first variable fluid volume to the second variable fluid volume when the transcowl is translating between the stowed position and the deployed position,
      a stow conduit in fluid communication with the first variable fluid volume and the second variable fluid volume, and
      a check valve disposed within the stow conduit and movable between a normally shut position and an open position, the check valve configured to direct fluid flow to bypass the throttle valve when the transcowl is translating from the deployed position to the stowed position.

2. The thrust reverser system of claim 1, wherein the throttle valve comprises:
a valve body including a first control volume and a second control volume;
a spool movably disposed within the valve body; and
a spring disposed within the first control volume and supplying a bias force to the spool.

3. The thrust reverser system of claim 2, further comprising:
a sense orifice disposed within the snubbing conduit between the throttle valve and the second variable fluid volume.

4. The thrust reverser system of claim 3, wherein:
the first control volume is in fluid communication with the snubbing conduit between the sense orifice and the second variable fluid volume; and
the second control volume is in fluid communication with the snubbing conduit between the throttle valve and the sense orifice.

5. The thrust reverser system of claim 1, further comprising:
an accumulator in fluid communication with the snubbing conduit and the stow conduit.

6. The thrust reverser system of claim 1, further comprising:
a snubbing orifice formed in the housing between the first variable fluid volume and the snubbing conduit.

7. The thrust reverser system of claim 1, further comprising:
a pressure sensor disposed within the snubbing conduit between the first variable fluid volume and the throttle valve, the pressure sensor configured to sense fluid pressure and supply pressure signals representative thereof; and
a health monitor coupled to receive the pressure signals from the pressure sensor.

8. The thrust reverser system of claim 1, further comprising:
a snubbing orifice formed in the housing between the first variable fluid volume and the snubbing conduit.

9. The thrust reverser system of claim 1, further comprising:
a pressure sensor disposed within the snubbing conduit between the first variable fluid volume and the throttle valve, the pressure sensor configured to sense fluid pressure and supply pressure signals representative thereof; and
a health monitor coupled to receive the pressure signals from the pressure sensor.

10. A thrust reverser system for a gas turbine engine, comprising:
a support structure configured to be mounted to the gas turbine engine;
a transcowl mounted on the support structure and axially translatable, relative to the support structure, between a stowed position and a deployed position;
an actuator responsive to commands supplied from a control to supply an actuation force to the transcowl to thereby move the transcowl between the stowed and deployed positions; and
a hydraulic assist mechanism coupled to the transcowl and configured to react reverse thrust loads on the transcowl at least when the transcowl is translating between the stowed position and the deployed position, the hydraulic assist mechanism including:
a housing having an inner surface that defines a piston chamber,
a piston movably disposed within the housing and dividing the piston chamber into a first variable fluid volume and a second variable fluid volume,
a rod having a first end and a second end, the first end coupled to the piston, the second end coupled to the transcowl, whereby the first variable fluid volume decreases when the transcowl is translating between the stowed position and the deployed position,
a snubbing conduit in fluid communication with the first fluid volume and the second fluid volume,
a snubbing orifice formed in the housing between the first variable fluid volume and the snubbing conduit,
a throttle valve disposed within the snubbing conduit and configured to throttle fluid flow from the first variable fluid volume to the second variable fluid volume when the transcowl is translating between the stowed position and the deployed position,
a stow conduit in fluid communication with the first variable fluid volume and the second variable fluid volume, and
a check valve disposed within the stow conduit and movable between a normally shut position and an open position, the check valve configured to direct fluid flow to bypass the throttle valve when the transcowl is translating from the deployed position to the position.

11. The thrust reverser system of claim 10, wherein the throttle valve comprises:
a valve body including a first control volume and a second control volume;
a spool movably disposed within the valve body; and
a spring disposed within the first control volume and supplying a bias force to the spool.

12. The thrust reverser system of claim 11, further comprising:
a sense orifice disposed within the snubbing conduit between the throttle valve and the second variable fluid volume.

13. The thrust reverser system of claim 12, wherein:
the first control volume is in fluid communication with the snubbing conduit between the sense orifice and the second variable fluid volume; and
the second control volume is in fluid communication with the snubbing conduit between the throttle valve and the sense orifice.

14. The thrust reverser system of claim 10, further comprising:
an accumulator in fluid communication with the snubbing conduit and the stow conduit.

15. The thrust reverser system of claim 10, further comprising:
a pressure sensor disposed within the snubbing conduit between the first variable fluid volume and the throttle valve, the pressure sensor configured to sense fluid pressure and supply pressure signals representative thereof; and
a health monitor coupled to receive the pressure signals from the pressure sensor.

16. A thrust reverser system for a gas turbine engine, comprising:
a support structure configured to be mounted to the gas turbine engine;
a transcowl mounted on the support structure and axially translatable, relative to the support structure, between a stowed position and a deployed position;

an actuator responsive to commands supplied from a control to supply an actuation force to the transcowl to thereby move the transcowl between the stowed and deployed positions; and a hydraulic assist mechanism coupled to the transcowl and configured to react reverse thrust loads on the transcowl at least when the transcowl is translating between the stowed position and the deployed position, the hydraulic assist mechanism including:

a housing having an inner surface that defines a piston chamber, a piston movably disposed within the housing and dividing the piston chamber into a first variable fluid volume and a second variable fluid volume, a rod having a first end and a second end, the first end coupled to the piston, the second end coupled to the transcowl, whereby the first variable fluid volume decreases when the transcowl is translating between the stowed position and the deployed position, a stow conduit in fluid communication with the first variable fluid volume and the second variable fluid volume, a check valve disposed within the stow conduit and movable between a normally shut position and an open position, a snubbing conduit in fluid communication with the first fluid volume and the second fluid volume, an accumulator in fluid communication with the snubbing conduit and the stow conduit, and a throttle valve disposed within the snubbing conduit and configured to throttle fluid flow from the first variable fluid volume to the second variable fluid volume when the transcowl is translating between the stowed position and the deployed position, wherein the check valve is configured to direct fluid flow to bypass the throttle valve when the transcowl is translating from the deployed position to the stowed position, and wherein the throttle valve comprises:

a valve body including a first control volume and a second control volume, a spool movably disposed within the valve body, and a spring disposed within the first control volume and supplying a bias force to the spool.

17. The thrust reverser system of claim 16, further comprising:

a sense orifice disposed within the snubbing conduit between the throttle valve and the second variable fluid volume.

18. The thrust reverser system of claim 17, wherein:

the first control volume is in fluid communication with the snubbing conduit between the sense orifice and the second variable fluid volume; and the second control volume is in fluid communication with the snubbing conduit between the throttle valve and the sense orifice.

* * * * *